United States Patent [19]

Moyer

[11] Patent Number: 4,946,722
[45] Date of Patent: Aug. 7, 1990

[54] PROTECTIVE FABRIC SLEEVES

[75] Inventor: James D. Moyer, Downingtown, Pa.

[73] Assignee: The Bentley-Harris Manufacturing Company, Lionville, Pa.

[21] Appl. No.: 252,181

[22] Filed: Sep. 30, 1988

[51] Int. Cl.5 .............................................. F16L 11/00
[52] U.S. Cl. ......................................... 428/36.1; 87/9; 138/123; 264/103; 428/36.3
[58] Field of Search ............................ 87/9; 138/123; 428/36.1, 36.3; 264/103, 288.8, 340

[56] References Cited

U.S. PATENT DOCUMENTS

| 1,924,576 | 10/1927 | Szegvari . | |
| 2,365,952 | 3/1942 | Hanson . | |
| 2,393,058 | 8/1943 | Pierce et al. . | |
| 2,525,285 | 2/1946 | Collins | 18/19 |
| 2,785,442 | 1/1952 | Boggs | 18/58.3 |
| 2,826,239 | 3/1958 | Villoresi . | |
| 3,243,328 | 10/1960 | Britton et al. | 156/195 |
| 3,364,289 | 10/1964 | Campbell | 264/103 |
| 3,466,210 | 1/1966 | Wareham | 156/86 |
| 3,499,072 | 3/1970 | Heller et al. | 264/151 |
| 4,283,362 | 8/1981 | Gold | 264/160 |
| 4,539,249 | 9/1985 | Curzio | 428/175 |

FOREIGN PATENT DOCUMENTS

| 1162543 | 9/1964 | Fed. Rep. of Germany . |
| 3444191 | 6/1986 | Fed. Rep. of Germany . |
| 1274999 | 9/1961 | France . |
| 1362680 | 4/1964 | France . |
| 2314813 | 6/1986 | France . |
| 338923 | 6/1959 | Switzerland . |

OTHER PUBLICATIONS

Brochure "Expando Zip Zippered Wraparound Sleeving" published on or about Dec. '86 by Bentley-Harris.

Primary Examiner—James J. Bell
Attorney, Agent, or Firm—John T. Synnestvedt; Charles H. Lindrooth

[57] ABSTRACT

Tubular sleeves formed from elongated flat sheets, particularly braided sheets are disclosed. Sheet material comprised of interlaced monofilaments is cold worked by the process of drawing the interlaced monofilaments over a forming edge with sufficient force and in a direction causing permanent elongation of the molecules of material on one side of the interlaced monofilaments. The cold worked monofilaments impart a permanent bias to the sheet causing it to curl about its longitudinal axis. Sleeves so formed may be slipped over or wrapped around bundles of wires or other elongated substrates, particularly those which include terminals, plugs and connectors of irregular dimension.

20 Claims, 1 Drawing Sheet

PROTECTIVE FABRIC SLEEVES

FIELD OF THE INVENTION

This invention relates to sleeves made from textile fabric and to methods of making same. More particularly, the invention relates to sleeves formed wholly or in part from monofilaments of materials such as engineered plastics or metals. The invention is particularly adapted to the forming of sleeves from flat woven or braided sheets comprised of monofilaments and treating flat, woven or braided monofilament sheets so that the monofilaments exert a bias in a direction transversely of the sheets so that they naturally and indefinitely assume a tubular configuration. Tubular sleeves formed as just described are of particular use for bundling and protecting elongated articles such as wiring and for hose coverings.

BACKGROUND OF INVENTION AND PRIOR ART

Encasing cables, hoses and other elongated flexible articles in tubular sleeves, particularly for the purpose of providing abrasion resistance, thereby maintaining the mechanical and electrical properties of the article is well-known in the art. Examples of such sleeving are those sold by the Bentley-Harris Manufacturing Company under the registered trademark EXPANDO. The EXPANDO sleeving is lightweight and provides tough physical protection for cable assemblies, hoses, wire harnesses and the like. The open construction of this type of product is of advantage over a solid material in that it breathes and prevents the entrapment of moisture. In addition, this type of sleeving maintains the bundled elongated articles in clean, compact condition and, depending upon the materials employed, may provide electrical shielding or protection from high temperatures, and has numerous other advantages well recognized in the art. The present invention provides advantages over the sleeving just described such as reduction in costs and simplified installation of the sleeving over multiple cables and other elongated articles and the ability to provide for multiple wire breakouts in a simple and effective fashion.

In certain aspects, the invention is related to EXPANDO products sold under the trademark EXPANDO ZIP which is a tubular braided sleeve of an engineered plastic material such as a polyester having a zipper bonded lengthwise of the sleeve which sleeve is thereafter axially split lengthwise between the zipper elements so that elongated articles may readily be placed within the sleeve and the sleeve thereafter closed. For certain applications, the present invention offers substantial improvements over the product just described and offers simplifications in the manner of making the product.

SUMMARY AND OBJECTS OF THE INVENTION

According to the invention, as is known in the art, most structural metals and certain plastic materials, typically the engineered plastic materials of the type used in the production of monofilaments, will assume a permanent set when stressed above their elastic limit. Although the elastic limit of most plastic materials is not so well defined as in the case of structural metals, being much more dependent upon changes in temperature and the like, it can be demonstrated that most plastic materials used in the production of textile monofilaments can be readily made to take a permanent set when stressed at room temperatures in a manner similar to metals.

In the method aspects of the present invention, flat, elongated, woven or braided sheets formed of structural metal wire monofilaments or of thermoplastic monofilaments having the ability to take a permanent set when cold worked under tension, are cold worked by drawing a woven or braided sheet over a forming edge under pressure and at a relatively sharp working angle. It is theorized that the drawing action produces a permanent molecular distortion on that side of the monofilaments away from the forming edge while leaving the molecules adjacent to the forming edge substantially undistorted, apparently because the material on the side adjacent to the forming edge does not exceed its elastic limit. The differential distortion causes the filaments to coil much like the end of the ribbon used for Christmas wrappings will curl when drawn across a knife edge. In a braided sheet, the invention takes advantage of the fact that the monofilaments of the braid criss cross diagonally so that when the sheet is drawn lengthwise across the forming edge, the cold worked monofilaments cause the sheet to permanently curl about its long axis. The same tendency to curl can be produced in woven sheet with warp and weft monofilaments provided that the monofilaments can be oriented sufficiently perpendicularly to the forming surface when worked so as to produce the necessary curl forces in the sheet.

Flat braided sheets are ideally suited for the production of resiliently biased sleeves of the invention in that monofilaments or groups of monofilaments forming the braid cross diagonally and extend longitudinally of the fabric sheets. Accordingly, elongated pieces of flat, braided fabric can be readily drawn over a forming edge with the long axis extending transversely of the plane of the edge, thereby quickly and easily inducing a permanent set in the diagonally extending monofilaments which acts to affect a transverse coiling of the edges of the sheet so that it assumes a tubular form.

One advantage of the use of sleeving made according to the invention is that the set induced by cold forming is substantially permanent under conditions of normal storage and use and an important object of the invention is the provision of braided or woven sheet material which will indefinitely retain its tendency to retain the tubular form even after storage in non-tubular form. Sleeving formed according to the invention may be rolled into tight cylindrical coils for storage and shipment prior to use. When the material is unwound from a stored cylindrical roll and is unrestrained, it naturally and immediately assumes the tubular form. Thus, a roll of permanently set material containing many yards of sleeving may be shipped to end users. Lengths of sleeving are taken from the roll as required and the balance of the roll stored in its compact form until needed.

Another advantage of the present invention is that the cold worked material may have zipper type or other fastener elements readily and easily applied to the side edges thereof using conventional sewing or bonding equipment since the preset material may be fed into a sewing or bonding machine using guide means which hold it flat during assembly without risk of diminishing the tendency of the material to assume the tubular configuration.

In use, the sleeving can be advanced from the end of a roll onto an assemblage of elongated wires or tubes as required. The configuration allows for a multiplicity of breakouts of wires wherever required. The sleeving can be readily bent to follow a sharp radius without kinking or appreciably opening up along its adjacent edges.

The foregoing and various other objectives of the invention will become fully apparent from the brief description of the drawings of the invention and from the detailed description of the invention which follows.

DETAILED DESCRIPTION OF THE PREFERRED EMBODIMENTS OF THE INVENTION

Although other fabric forming techniques may be employed to achieve some of the objectives of the inventions, these objectives are best achieved by the use of flat braiding machines to produce flat braided elongated sheets formed wholly or in part of monofilament ends. Although other materials may be incorporated into the braided structure, the properties of the products formed according to the invention are produced by the use in the fabric of warp monofilaments selected from materials which can be cold worked to induce a permanent set causing the ribbon or sheet to coil transversely of its longitudinal axis. In addition to the foregoing, the braided products utilized in the production of sleeving are preferably characterized by an open construction which produces fabrics that breath and prevents the entrapment of moisture.

Preferably the monofilaments used are of polyester due to the abrasion resistant properties of this material. Where even more abrasion resistance or RF shielding or other electrical properties are desired, a metallic monofilament may be employed either entirely or in combination with plastic materials. Thermoplastic members of the family of plastics known as engineered plastic materials, which are suitable for production of textile monofilaments are generally suitable for use in the construction of sleeves formed according to the present invention.

Materials in the family of engineered plastics of the type referred to herein include plastics that have a tensile modulus of greater than 50,000 psi, and in the range from about 50,000 psi to about 200,000 psi. Thermoplastic materials within the group of engineered plastics are particularly suitable for use in the formation of products according to the invention. It is especially preferred to use polyester as the material for the monofilaments.

Resilient metal wires of the type suitable for use in practicing the invention are those capable of being braided using conventional braiding machines and ranging in diameter from about 6 to about 20 mils. Although not intended in a limiting sense but merely by way of example, metal wire made of silver or stainless steel may be employed.

Monofilaments formed from these materials which are capable of assuming a permanent set using the techniques of the present invention can be readily selected by a few trial runs.

Figure 1:
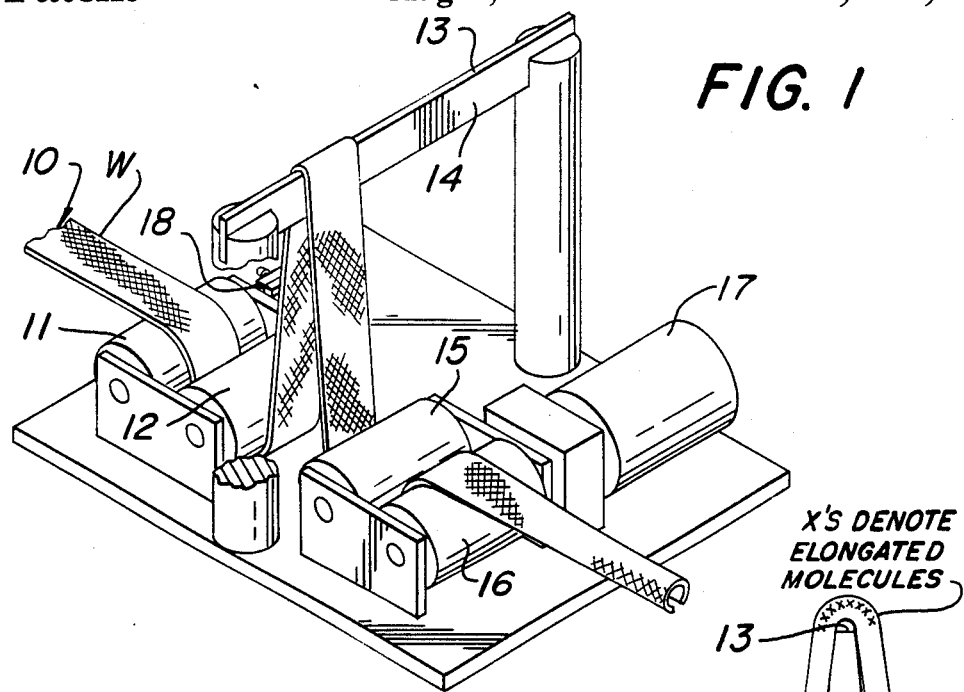
FIGS. 1 and 2 illustrate apparatus and method used in the manufacture of sleeving formed according to the invention.
Figure 2:
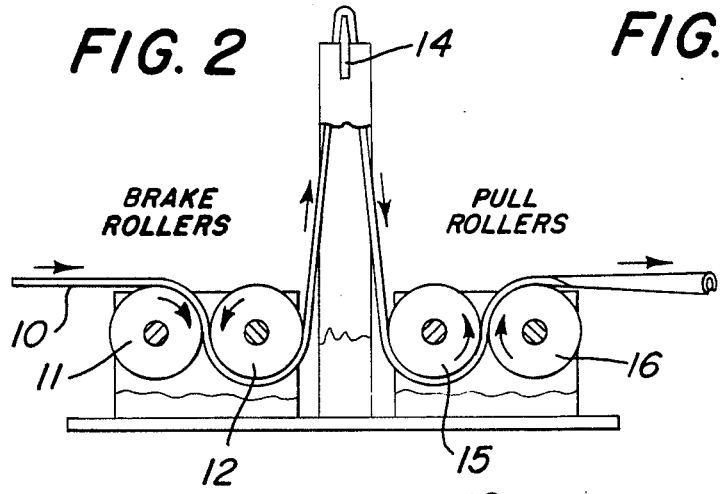

In the fabrication of tubes, the fabric, preferably made in sheet form by a flat braiding process, is provided in ribbon form. Braided ribbon is shown at 10, in FIGS. 1 and 2. The ribbon has a width equal to or greater than the circumference of the tubing which it is to form. The ribbon 10 is fed from a supply not shown, in a path extending between a pair of brake rollers 11 and 12, transversely over a sharply radiused forming edge 13, and between a pair of pull rollers 15 and 16, one of which is driven by a motor 17. The combination of pull and brake rollers draws the fabric ribbon over forming edge 13 on a forming blade 14 with the requisite predetermined tension which is selected to induce the desired stresses within the material. The tension can be varied by means of an adjusting screw 18 which varies the nip pressure between rollers 11 and 12.

Although as indicated above, other materials may be employed, sheet 10 in the illustrative embodiment is comprised of ends of polyester monofilaments wherein each end has four untwisted monofilaments 10 mils in diameter. The sheet material used in the illustrative example was of open braided construction 2 ½ inches wide and had a braid angle of about forty degrees.

Figure 3:
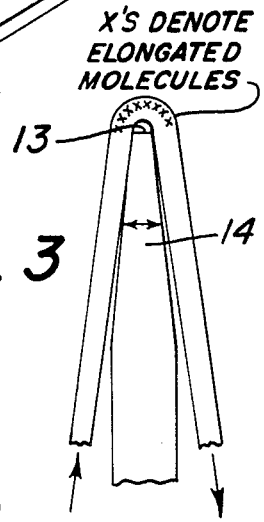
FIG. 3 is an enlarged diagrammical view of a forming edge illustrating the differential stressing of an individual monofilament.

A number of factors influence the tendency of the sheet material to curl into an elongated tube as it is passed over the forming edge 13. As shown in FIG. 3, the blade radius of surface 13 and the angle formed by the sheet material as it passes around this radius should be relatively sharp in order to increase the working on the side of the monofilaments away from the surface relative to the opposite surface. However, care must be taken that the radius is not so sharp as to result in a cutting or shaving of the monofilaments. In the cold working of polyester monofilamentary material, a blade radius which is about ½ the diameter of the monofilaments has been found to produce satisfactory results without cutting the monofilaments. Another physical factor affecting the degree of biasing effect is the angle at which individual monofilaments cross the forming edge. In an open braided structure, the trellis effect will cause the tensioned monofilament ends to more closely approach the long axis of the structure so that they cross the working edge at an angle which is more nearly perpendicular to the edge than would be the case when the sheet is in a relaxed state. This effect advantageously increases the curl tendency of the sheet when the sheet is relaxed and the individual monofilament ends are allowed to return to the normal braid angle. Tubes in which the side edges overlap by as much as thirty degrees can be readily produced.

Figures 4, 5:
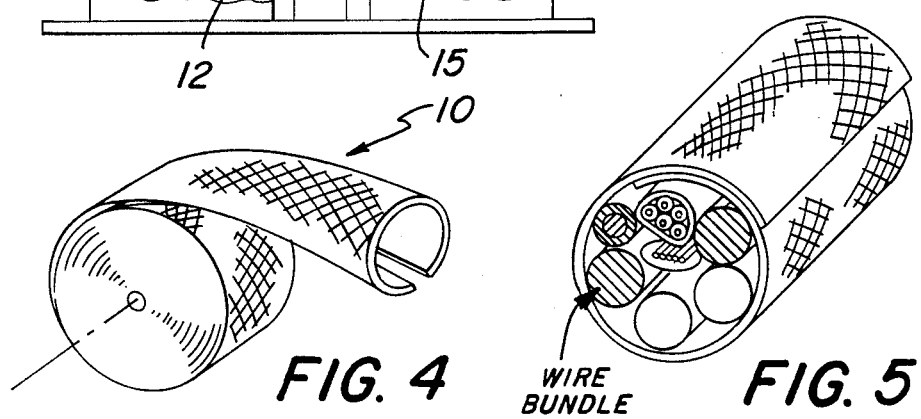
FIG. 4 shows the sleeve of FIG. 1 wound into a multi-turned cylindrical-type roll for storage and shipment.
FIG. 5 shows a cross section of a braided sleeve made in accordance with the present invention and wrapped around a bundle of wires.

Once the sheet is cold worked, as just described, it may be coiled into tightly wound cylinders as shown in FIG. 4 for storage, shipment and subsequent use without detriment to the preset bias produced by cold working. It has been found that this bias is of substantially permanent duration under normal temperature conditions, apparently because the molecules on the side of each monofilament which is away from the forming edge are permanently elongated as the material on that side exceeds its elastic limit. At the same time, the material on the side of each monofilament in contact with the forming edge is not so highly stressed and does not exceed its elastic limit so that no permanent elongation takes place.

It can be seen that the permanent set thereby induced imparts to the product several advantages.

Sleeves made according to the invention exhibit no tendency to relax and open up when exposed to the range of temperatures to which such products are subjected in actual use. In addition, cold worked sleeves can be more easily worked on in a flat condition. For example, cold worked sleeves formed according to the invention can be guided through conventional sewing machines or fuse-bonding machines as flat sheets for the application of zipper type fastener elements without in any way impairing the bias effect. Once the fastener elements are attached and the sleeve is not restrained, it resumes the tubular configuration.

If desired, additional strength may be imparted to the sleeve by interbraiding wires. Stainless steel and silver wires have been found to produce sleeves having the performance characteristics herein mentioned by use of the teachings of the present invention.

What is claimed is:

1. An elongated fabric sleeve for protection of conduit, cable or the like, said sleeve being formed of an elongated braided sheet comprised of monofilaments formed from a material which is cold workable to take a permanent set when subjected to a stress beyond its elastic limit, the surfaces of said monofilaments on one side of said braided sheet being subjected to longitudinal stress to a value beyond the elastic limit of the material and the opposite surfaces being relatively unstressed, whereby the braided sheet is permanently biased to form a tubular sleeve having its longitudinal axis extending lengthwise of the sheet with the side edges of the sheet being adjacent one another.

2. An elongated sleeve according to claim 1 wherein said monofilaments are a metal wire.

3. An elongated sleeve according to claim 1 wherein said monofilaments are formed of a thermoplastic material.

4. An elongated sleeve according to claim 3 wherein said monofilaments are formed of polyester resin.

5. An elongated sleeve made by drawing a sheet of angularly disposed interlaced monofilaments transversely of a stress inducing forming edge, under tension and at a work angle sufficient to stress the surfaces of the monofilaments opposite to the forming edge differentially with respect to the surfaces exposed to the forming edge, the material on the surfaces opposite to the forming edge being stressed beyond the elastic limit thereof, whereby the sheet is biased to a tubular configuration about the longitudinal axis thereof with the side edges of the sheet being urged in an adjacent relation with one another.

6. A sleeve according to claim 5 wherein the sheet is a braided sheet.

7. A sleeve according to claim 5 wherein said sheet is a woven sheet.

8. A sleeve according to claim 6 further including fastening means for interconnecting the side edges of said sheet.

9. A sleeve according to claim 8 wherein the fastening means comprises a zipper having a first portion connected to one edge of the sheet and a second portion connected to a second edge and means for slidable interconnecting said first and second portions.

10. A method of making a tubular sleeve comprising braiding a sheet of monofilaments of a material which is cold workable to take a permanent set when subjected to stress at a predetermined value, drawing the sheet along a path extending transversely of and in contact with a relatively sharply radiused forming edge while maintaining sufficient sheet tension to collectively and permanently stress the side of the monofilaments away from the forming edge at the predetermined value while maintaining the stress value on the opposite side of the monofilaments below the predetermined value whereby the braided sheet assumes a tubular form with the side edges of the sheet being biased into substantial contact with each other.

11. A method according claim 10 wherein the material of the monofilaments is a thermoplastic material.

12. A method according to claim 11 wherein the material of the monofilaments is a metal wire.

13. The method according to claim 12 further comprising coiling the prestressed sheet into a cylindrical roll having its center on an axis which is transverse to the long axis of the sheet.

14. A sleeve formed by the method of claim 10.

15. A method of making a tubular sleeve comprising a fabric sheet of having interlaced monofilaments of a material which is cold workable to take a permanent set when subjected to stress at a predetermined value, drawing the sheet along a path extending transversely of and around a relatively sharply radiused forming edge while maintaining sufficient sheet tension to collectively and permanently stress the sides of the interlaced monofilaments away from the forming edge at the predetermined value while maintaining the stress value on the opposite side of the monofilaments below the predetermined value whereby the fabric sheet assujes a tubular form with the side edges of the sheet being biased into substantial contact with each other.

16. A method according to claim 15 wherein said sheet is a braided sheet.

17. A method according to claim 16 wherein the material of the monofilaments is a thermoplastic material.

18. A method according to claim 17 wherein the material of the monofilaments is a metal wire.

19. A method according to claim 18 further comprising coiling the prestressed sheet into a cylindrical roll having its center on an exis which is transverse to the long axis of the sheet.

20. A sleeve formed by the method of claim 19.

* * * * *

UNITED STATES PATENT AND TRADEMARK OFFICE
CERTIFICATE OF CORRECTION

PATENT NO. : 4,946,722

DATED : August 7, 1990

INVENTOR(S) : James D. Moyer

It is certified that error appears in the above-identified patent and that said Letters Patent is hereby corrected as shown below:

Column 6, line 43, "assujes" should be --assumes--

Column 6, line 55, "exis" should be --axis--

Signed and Sealed this

Thirty-first Day of December, 1991

Attest:

HARRY F. MANBECK, JR.

Attesting Officer        Commissioner of Patents and Trademarks